United States Patent
Mutnury et al.

(10) Patent No.: US 9,178,626 B2
(45) Date of Patent: Nov. 3, 2015

(54) SYSTEM AND METHOD OF ENHANCING SIGNAL INTEGRITY

(71) Applicants: Bhyrav M. Mutnury, Round Rock, TX (US); Douglas E. Wallace, Lakeway, TX (US)

(72) Inventors: Bhyrav M. Mutnury, Round Rock, TX (US); Douglas E. Wallace, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 13/829,172

(22) Filed: Mar. 14, 2013

(65) Prior Publication Data

US 2014/0269971 A1    Sep. 18, 2014

(51) Int. Cl.
*H04B 15/00* (2006.01)
*H04B 1/04* (2006.01)
*H04B 3/32* (2006.01)
*H04W 24/00* (2009.01)

(52) U.S. Cl.
CPC .............. *H04B 15/00* (2013.01); *H04B 1/0475* (2013.01); *H04B 3/32* (2013.01); *H04W 24/00* (2013.01)

(58) Field of Classification Search
None
See application file for complete search history.

(56) References Cited

U.S. PATENT DOCUMENTS

| | | | | |
|---|---|---|---|---|
| 5,257,286 A * | 10/1993 | Ray | ............................... | 375/230 |
| 5,377,096 A * | 12/1994 | Ono | ............................... | 700/71 |
| 2005/0030888 A1* | 2/2005 | Thesling | ...................... | 370/208 |
| 2006/0009231 A1* | 1/2006 | Emami et al. | .............. | 455/452.2 |

* cited by examiner

*Primary Examiner* — Leon-Viet Nguyen
(74) *Attorney, Agent, or Firm* — Baker Botts L.L.P.

(57) ABSTRACT

A signal processing method is disclosed. The method includes identifying a preferred loss profile for a plurality of signal transmission channels and generating a filter transfer function corresponding to each of the plurality of signal transmission channels, where each filter transfer function is configured to produce a filtered signal with a loss profile approximately equal to the preferred loss profile. The method further includes generating a plurality of filtered signals by filtering a plurality of signals using the filter transfer function corresponding to each of the plurality of signal transmission channels. and transmitting the plurality of filtered signals to a plurality of receivers via the plurality of signal transmission channels.

15 Claims, 3 Drawing Sheets

SYSTEM AND METHOD OF ENHANCING SIGNAL INTEGRITY

TECHNICAL FIELD

This disclosure relates generally to information handling systems and more particularly to signal transmission among components of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. For example, an information handling system may be a tablet computer or mobile device (e.g., personal digital assistant (PDA) or smart phone) configured to transmit data on a wireless communications network. Information handling systems may include a variety of hardware and software components that may be configured to process, store, and communicate information and may include one or more computer systems, data storage systems, and networking systems.

Many different types of channels and signal transmission methods may be used to transmit data between components of an information handling system. The channels over which the signals are transmitted may negatively affect signal integrity. For example, certain channels may be prone to frequency loss and/or high reflectivity, both of which may degrade and/or attenuate the data signal.

SUMMARY

In one embodiment of the present disclosure, a signal processing method is disclosed. The method includes identifying a preferred loss profile for a plurality of signal transmission channels and generating a filter transfer function corresponding to each of the plurality of signal transmission channels, where each filter transfer function is configured to produce a filtered signal with a loss profile approximately equal to the preferred loss profile. The method further includes generating a plurality of filtered signals by filtering a plurality of signals using the filter transfer function corresponding to each of the plurality of signal transmission channels. and transmitting the plurality of filtered signals to a plurality of receivers via the plurality of signal transmission channels.

In another embodiment of the present disclosure, an information handling system is disclosed. The system includes a plurality of receivers, a plurality of signal transmission channels, and a plurality of transmitters. Each transmitter is communicatively coupled to one of the plurality of receivers via one of the plurality of signal transmission channels. Each transmitter is configured to generate a filter transfer function configured to produce a filtered signal with a loss profile approximately equal to a preferred loss profile of the plurality of signal transmission channels. Each transmitter is further configured to generate a filtered signal using the filter transfer function, and transmit the filtered signal to one of the plurality of receivers via one of the plurality of signal transmission channels.

In yet another embodiment of the present disclosure, a computer readable storage medium including computer-executable instructions carried on the computer readable medium is disclosed. The instructions are readable by a processor and, when read and executed, configured to cause the processor to generate a filter transfer function configured to produce a filtered signal with a loss profile approximately equal to a preferred loss profile of a plurality of signal transmission channels. The instructions, when read and executed, are further configured to generate a filtered signal using the filter transfer function, and transmit the filtered signal to a receiver via one of the plurality of signal transmission channels.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein.

DETAILED DESCRIPTION

Figure 1:
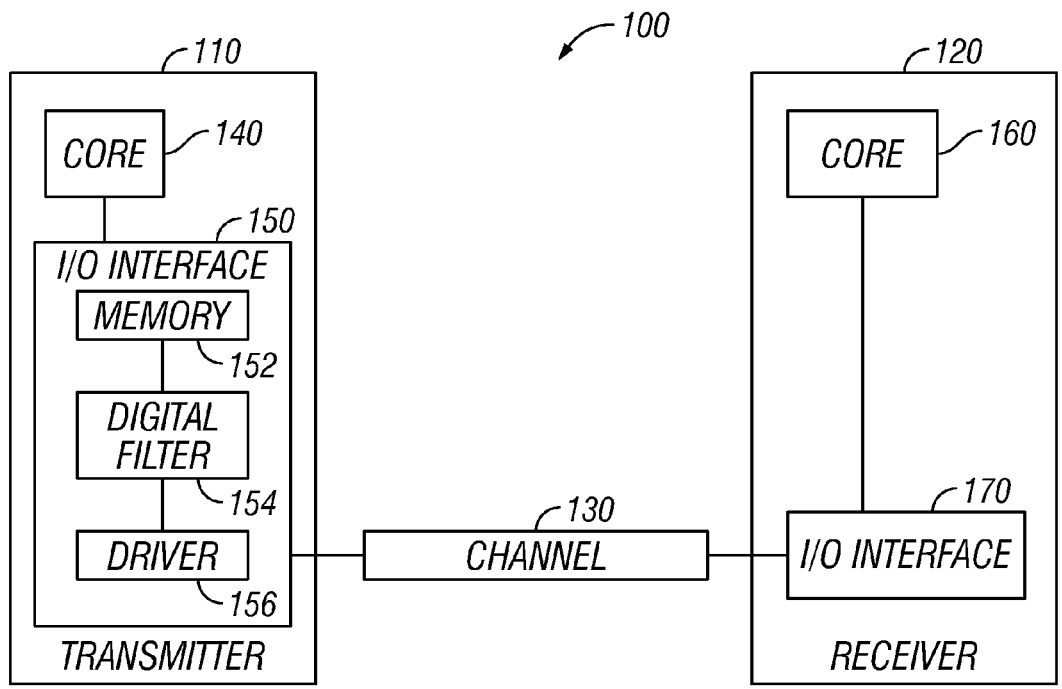
FIG. 1 is a block diagram of an example information handling system including a digital filter, in accordance with the teachings of the present disclosure.

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch-screen and/or a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

The various channels on which signals are transmitted in an information handling system may have different loss profiles. The loss profile of a particular channel may be characterized by the level and type of frequency loss experienced by a signal transmitted on the channel, as well as the reflectivity of the channel. The high-speed signals used to transmit data between components of an information handling system may be subject to high-frequency losses, which may degrade and attenuate the high-frequency content of the signal. High-frequency losses may increase as the length of the transmission channel increases. Techniques, such as transmitter pre-emphasis and linear equalization, have been developed to improve signal integrity by boosting the high-frequency component of the signal to compensate for high-frequency losses. When these equalization techniques are applied to signals transmitted on channels with different loss profiles, however, they may negatively affect signal integrity. Consider, for example, a highly reflective transmission channel with low levels of high-frequency loss. If transmitter pre-emphasis is used to boost the high-frequency component of a signal transmitted on such a channel, the effect of reflections in the transmission channel may be amplified.

The teachings of the present disclosure may be used to enhance signal integrity by equalizing the loss profiles of the various channels on which signals are transmitted in an information handling system. For example, signals may be filtered such that the signal loss of the resulting signal approximates a preferred loss-profile, which may be equalized across the various channels of an information handling system.

FIG. 1 is a block diagram of an example information handling system 100 including a digital filter, in accordance with the teachings of the present disclosure. Information handling system 100 may include a transmitter 110 communicatively coupled to a receiver 120 via a transmission channel 130.

Transmitter 110 may be an application-specific integrated circuit (ASIC). For example, transmitter 110 may be a processor, a memory, a network interface, or any other application-specific integrated circuit. Transmitter 110 may include a logic core 140 communicatively coupled to an I/O interface 150. Logic core 140 may include any system, device, or apparatus operable to interpret and/or execute program instructions and/or process data. For example, logic core 140 may include a processor. I/O interface 150 may include any system, device, or apparatus operable to send and receive data. For example, I/O interface 150 may include a memory 152, a digital filter 154, and a driver 156. Memory 152 may include any system, device, or apparatus configured to retain program instructions and/or data for a period of time (e.g., computer-readable storage media). For example, memory 152 may include random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing. Digital filter 154 may be a finite impulse response (FIR) filter and driver 156 may be a digital-to-analog converter operable to convert digital signal bit data into analog output voltages. In some embodiments, driver 156 may have an output impedance of approximately 50 ohms.

Signal transmission channel 130 may include a signal trace on a printed circuit board (PCB), group of signal traces on a PCB, cable, flex circuit, wireharness, or any other communications media. Signal transmission channel 130 may have a unique loss profile, which may affect the signal integrity of signals transmitted on signal transmission channel 130. For example, signals transmitted on signal transmission channel 130 may be subject to a particular level of high-frequency loss, which may degrade and attenuate the high-frequency content of the signal. High-frequency losses may increase as the length of signal transmission channel 130 increases. As another example, signals transmitted on signal transmission channel 130 may be subject to reflections (e.g., a portion of the signal power may be reflected back to the transmitter instead of continuing to the receiver). Reflections may occur due to imperfections in signal transmission channel 130 that cause an impedance mismatch and/or a non-linear change in the channel characteristics. Reflections may reduce signal power and/or cause an irregular time variation of period signal properties, which may be referred to as "jitter."

Like transmitter 110, receiver 120 may be an application-specific integrated circuit (ASIC). For example, receiver 120 may be a processor, a memory, a network interface, or any other application-specific integrated circuit. Receiver 120 may include a logic core 160 communicatively coupled to an I/O interface 170. Logic core 160 may include any system, device, or apparatus operable to interpret and/or execute program instructions and/or process data. For example, logic core 160 may include a processor. I/O interface 170 may include any system, device, or apparatus operable to send and receive data.

A data signal may be transmitted from transmitter 110 to receiver 120 via signal transmission channel 130. In some embodiments, a data signal may originate in transmitter 110 or in a component of information handling system 100 that is communicatively coupled to transmitter 110. Digital filter 154 may receive a data signal from memory 152 and or logic core 140. The data signal may be filtered by digital filter 154 such that the signal loss of the filtered signal approximates a preferred loss profile for signal transmission channel 130. The filtered signal may be transmitted to receiver 120 via signal transmission channel 130.

Figure 2:
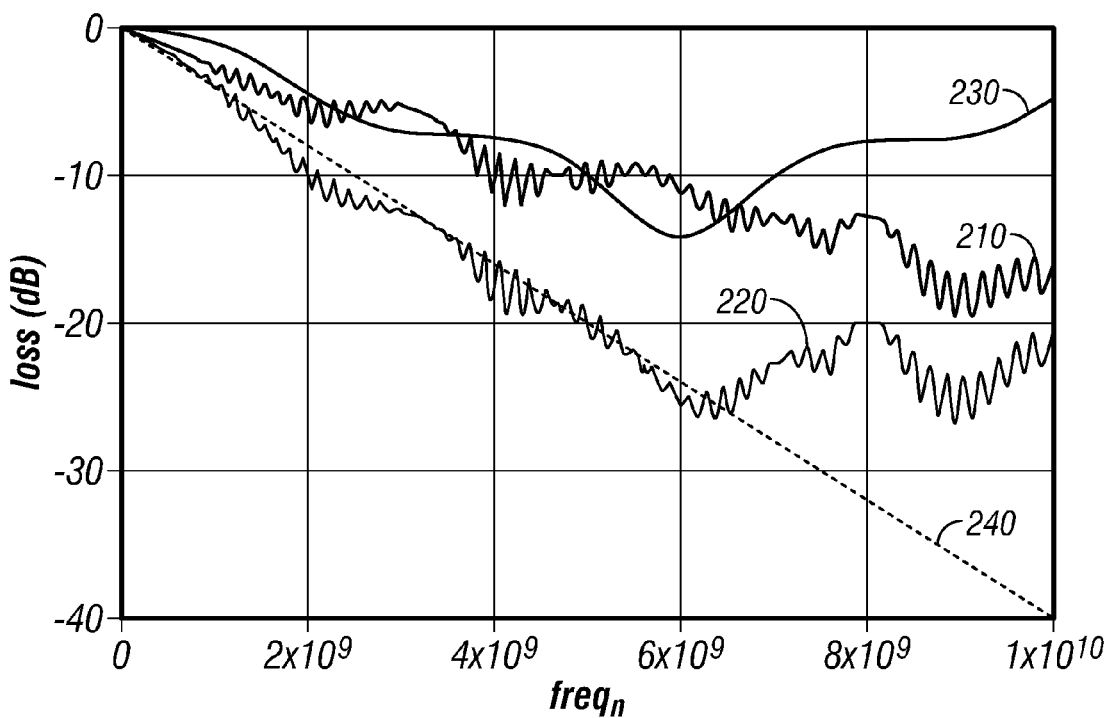
FIG. 2 is a graph of the waveform of a signal that has been digitally filtered in accordance with the teachings of the present disclosure compared to the waveform of an unfiltered signal.

FIG. 2 is a graph that compares the waveforms of an unfiltered signal transmitted on signal transmission channel 130 with the waveform of a signal that has been digitally-filtered in accordance with the teachings of the present disclosure. Waveform 210 illustrates the waveform of an unfiltered signal transmitted on signal transmission channel 130, waveform 220 illustrates the waveform of a signal that has been filtered by digital filter 154, and waveform 230 illustrates the transfer function of digital filter 154. Dotted line 240 illustrates the preferred loss profile of signal transmission channel 130.

The transfer function of digital filter 154, which is illustrated in FIG. 2 as waveform 230, may be represented by the following equation: $H(f) = \Sigma_{n=0}^{N} C_n (j2\pi fT)^{-n}$, where $C_n$ is the coefficient of the digital filter, f is the frequency of interest, T is the sampling period (which may also be expressed as 1/f), and j is $\sqrt{-1}$. In some embodiments, f may be approximately equal to the Nyquist frequency (6 GHz). Where f is the Nyquist frequency, T may be equal to 1/f, which may be equal to approximately $1.67 \times 10^{-10}$. In some embodiments, digital filter 154 may be a three-tap filter. For a three-tap filter, the transfer function may be expressed as:

$$H(f) = \frac{C_0 + C_1 e^{-j2\pi fT} + C_2 e^{-j4\pi fT} + C_3 e^{-j6\pi fT}}{(|C_0| + |C_1| + |C_2| + |C_3|)},$$

which reduces to $$H(f) = 20 * \log \frac{C_0 - C_1 + C_2 - C_3}{(|C_0| + |C_1| + |C_2| + |C_3|)}$$

at the Nyquist frequency of 1/(2*T). The value of filter coefficients, $C_0$, $C_1$, $C_2$, and $C_3$, may be chosen based on the loss profile of signal transmission channel 130. For example, the value of filter coefficients, $C_0$, $C_1$, $C_2$, and $C_3$, may be chosen such that the signal loss of waveform 220 of the filtered signal approximates preferred loss profile 240.

For example, waveform 210 illustrates that the signal loss on signal transmission channel 130 is approximately eleven decibels (11 dB) at the Nyquist frequency (6 GHz). The preferred signal loss at this frequency, however, may be approximately twenty-four decibels (24 dB), which is illustrated by preferred loss profile 240. Filter coefficients, $C_0$, $C_1$, $C_2$, and $C_3$, may be selected such that the signal loss on signal transmission channel 130 is approximately equal to that of preferred loss profile 240 at the Nyquist frequency (6 GHz). In some embodiments, filter coefficients, $C_0$, $C_1$, $C_2$, and $C_3$ may be equal to 0.5, 0.3, 0.1, and 0.1, respectively. Using these values for filter coefficients $C_0$, $C_1$, $C_2$, and $C_3$, waveform 220 illustrates that the signal loss of the filtered signal approximates preferred loss profile 240 at the Nyquist frequency (6 GHz).

In some embodiments, a system administrator and/or system designer may identify and set the value of the filter coefficients of digital filter 154 at or before the time system 100 is initialized. In other embodiments, the value of the filter coefficients of digital filter 154 may be initially set by a system administrator and/or system designer and modified based on the performance of system 100. For example, a system administrator and/or system designer may evaluate the signal integrity of a data signal received at receiver 120 and modify the value of the filter coefficients of digital filter 154 such that the signal loss of the filtered signal more closely approximates a preferred loss profile for signal transmission channel 130. In still other embodiments, receiver 120 may be configured to transmit a waveform of the received signal to logic core 140 of transmitter 110. Logic core 140 may be configured to evaluate the waveform and modify the value the filter coefficients of digital filter 154 such that the signal loss of the filtered signal more closely approximates a preferred loss profile for signal transmission channel 130.

Figure 3:
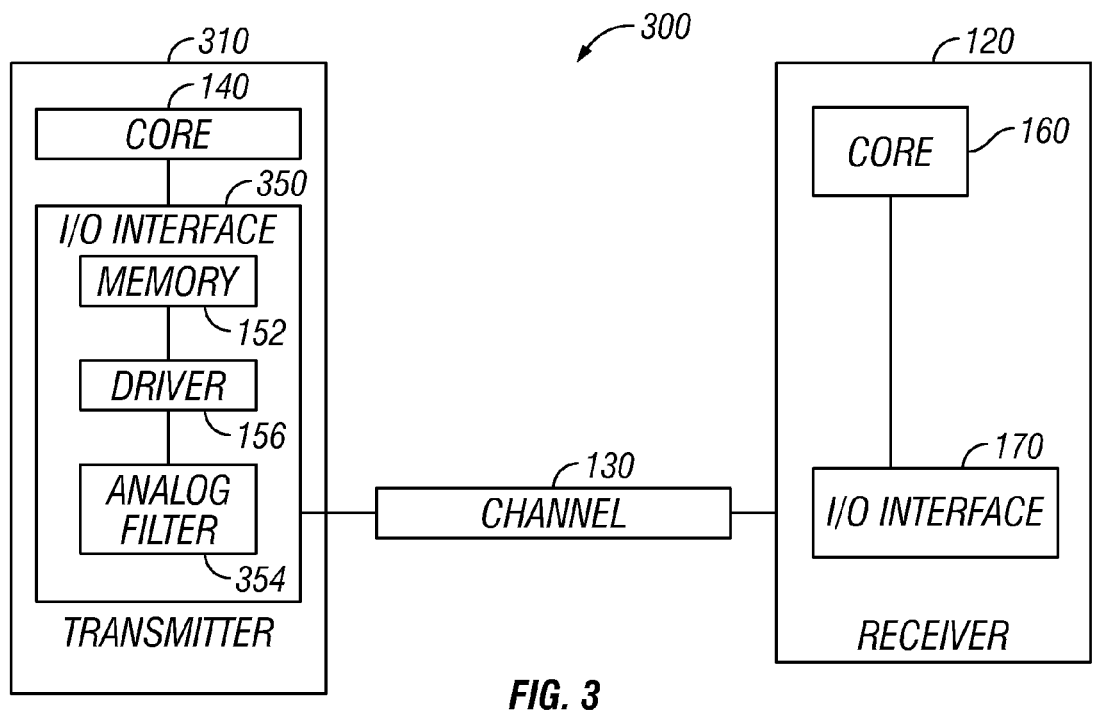
FIG. 3 is a block diagram of an example information handling system including an analog filter, in accordance with the teachings of the present disclosure.

FIG. 3 is a block diagram of an example information handling system 300 including an analog filter, in accordance with the teachings of the present disclosure. Information handling system 300 may include a transmitter 310 communicatively coupled to a receiver 120 via a transmission channel 130.

Transmitter 310 may be an application-specific integrated circuit (ASIC). For example, transmitter 310 may be a processor, a memory, a network interface, or any other application-specific integrated circuit. Transmitter 310 may include a logic core 140 communicatively coupled to an I/O interface 350. As discussed above with respect to FIG. 1, logic core 140 may include any system, device, or apparatus operable to interpret and/or execute program instructions and/or process data. I/O interface 350 may include any system, device, or apparatus operable to send and receive data. For example, I/O interface 350 may include a memory 152, a driver 156, and an analog filter 354. Analog filter 354 may be a passive linear filter or any other suitable type of analog filter.

A data signal may be transmitted from transmitter 310 to receiver 120 via signal transmission channel 130. In some embodiments, a data signal may originate in transmitter 310 or in a component of information handling system 300 that is communicatively coupled to transmitter 310. Analog filter 354 may receive a data signal from memory 152 and or logic core 140. The data signal may be filtered by analog filter 354 such that the signal loss of the filtered signal approximates a preferred loss profile for signal transmission channel 130. The filtered signal may be transmitted to receiver 120 via signal transmission channel 130.

Figure 4:
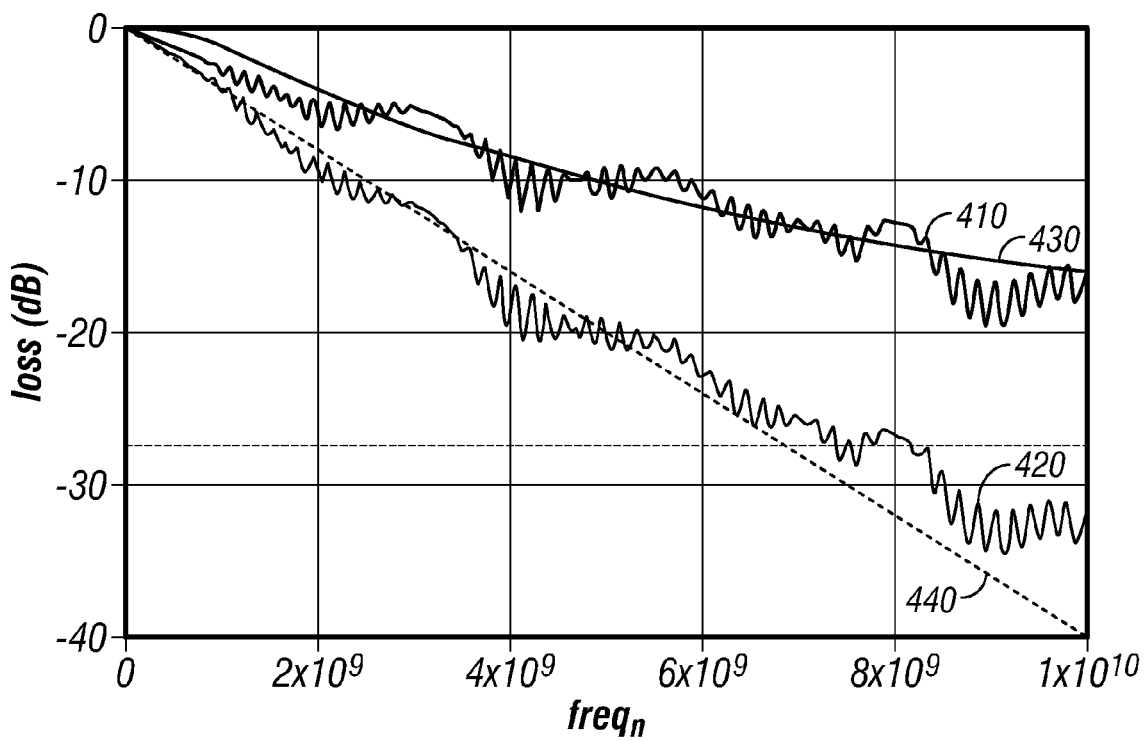
FIG. 4 is a graph of the waveform of a signal that has been filtered using an analog filter in accordance with the teachings of the present disclosure compared to the waveform of an unfiltered signal.

FIG. 4 is a graph that compares the waveforms of an unfiltered signal transmitted on signal transmission channel 130 with the waveform of a signal that has been filtered by analog filter 354 (shown in FIG. 3), in accordance with the teachings of the present disclosure. Waveform 410 illustrates the waveform of an unfiltered signal transmitted on signal transmission channel 130, waveform 420 illustrates the waveform of a signal that has been filtered by analog filter 354, and waveform 430 illustrates the transfer function of analog filter 354. Dotted line 440 illustrates the preferred loss profile of signal transmission channel 130.

The transfer function of analog filter 354, which is illustrated in FIG. 4 as waveform 430, may be represented by the following equation:

$$H(f) = \frac{f_{p1}}{f + f_{p1}} * \frac{f_{p2}}{f + f_{p2}} * G,$$

where f is the frequency of interest, $f_{p1}$ and $f_{p2}$ are the frequencies at the poles of the analog filter, and G is a gain constant. In some embodiments, f may be equal to the Nyquist frequency (6 GHz). In some embodiments, the value of the gain constant, G, may be approximately equal to or less than one (1). Much like filter coefficients, $C_0$, $C_1$, $C_2$, and $C_3$, of digital filter 154 (discussed above in conjunction with FIG. 2), the values of pole frequencies $f_{p1}$ and $f_{p2}$ may be chosen based on the loss profile of signal transmission channel 130. For example, the value of pole frequencies $f_{p1}$ and $f_{p2}$ may be chosen such the signal loss of waveform 420 of a filtered signal approximates preferred loss profile 240.

For example, waveform 410 illustrates that the signal loss on signal transmission channel 130 is approximately eleven decibels (11 dB) at the Nyquist frequency (6 GHz). The preferred signal loss at this frequency, however, may be approximately twenty-four decibels (24 dB), which is illustrated by preferred loss profile 440. Pole frequencies $f_{p1}$ and $f_{p2}$ may be selected such that the signal loss on signal transmission channel 130 is approximately equal to that of preferred loss profile 440 at the Nyquist frequency (6 GHz). In some embodiments, the gain constant (G) may be equal to one (1) and pole frequencies $f_{p1}$ and $f_{p2}$ may be equal to 1.6 GHz and 300 GHz, respectively. Using these values for the gain constant and pole frequencies, 420 illustrates that the signal loss of the filtered signal approximates that of preferred loss profile 440 at the Nyquist frequency (6 GHz).

In some embodiments, a system administrator and/or system designer may identify and set the value of pole frequencies $f_{p1}$ and $f_{p2}$ at or before the time system 300 is initialized. In other embodiments, the value of pole frequencies $f_{p1}$ and $f_{p2}$ may be initially set by a system administrator and/or system designer and modified based on the performance of system 300. For example, a system administrator and/or system designer may evaluate the signal integrity of a data signal received at receiver 120 and modify the value of pole frequencies $f_{p1}$ and $f_{p2}$ such that the signal loss of the filtered signal more closely approximates a preferred loss profile for signal transmission channel 130. In still other embodiments, receiver 120 may be configured to transmit a waveform of the received signal to logic core 140 of transmitter 310. Logic core 140 may be configured to evaluate the waveform and modify the value of pole frequencies $f_{p1}$ and $f_{p2}$ such that the signal loss of the filtered signal more closely approximates the preferred loss profile for signal transmission channel 130.

Figure 5:
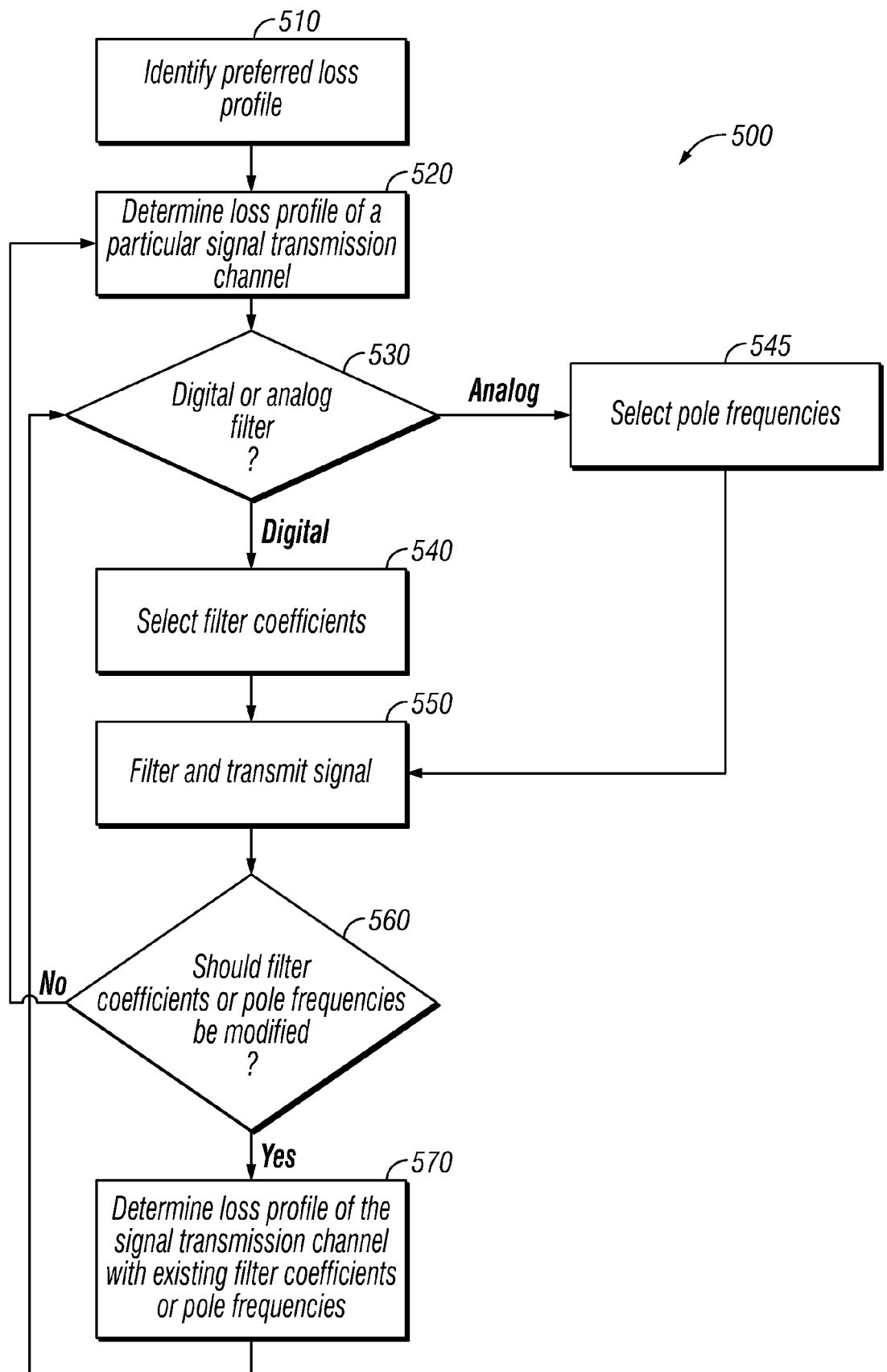
FIG. 5 is a flow chart of an example method of signal processing, in accordance with the teachings of the present disclosure.

FIG. 5 is a flow chart of an example signal processing method, in accordance with the teachings of the present disclosure. Although FIG. 5 discloses a particular number of steps to be taken with respect to example method 500, method 500 may be executed with more or fewer steps than those depicted in FIG. 5. In addition, although FIG. 5 discloses a certain order of steps to be taken with respect to method 500, the steps comprising these methods may be completed in any suitable order. Method 500 may be implemented using the systems of FIG. 1, FIG. 3, and/or or any other suitable mechanism. In certain embodiments, method 500 may be implemented partially or fully in software embodied in computer-readable storage media.

In some embodiments, method 500 may begin at step 510. At step 510, a preferred loss profile may be identified for signal transmission channels in an information handling system. The signal transmission channels of an information handling system may have varying loss profiles. To enhance signal integrity, the loss profiles of the various channels on which signals are transmitted may be equalized such that the signal loss experienced by signals transmitted on each channel approximates a preferred loss profile for the information handling system.

At step 520, the loss profile of a particular signal transmission channel may be determined. In some embodiments, a signal may be transmitted from a transmitter to a receiver via the particular signal transmission channel. A graph of the waveform of the signal received at the receiver may be analyzed to determine the signal loss experienced at various frequencies.

At step 530, a determination may be made regarding whether the information handling system includes a digital filter or an analog filter. If the system includes a digital filter, the method may proceed to step 540. At step 540, the value of the filter coefficients may be selected. As discussed above with respect to FIG. 2, the transfer function of a three-tap digital filter may be expressed as:

$$H(f) = \frac{C_0 + C_1 e^{-j2\pi fT} + C_2 e^{-j4\pi fT} + C_3 e^{-j6\pi fT}}{(|C_0| + |C_1| + |C_2| + |C_3|)}$$

where $C_0$, $C_1$, $C_2$, and $C_3$ are the filter coefficients, f is the frequency of interest, T is the sampling period (which may also be expressed as 1/f), and j is $\sqrt{-1}$. In some embodiments, f may be approximately equal to the Nyquist frequency (6 GHz). Where f is the Nyquist frequency, T may be equal to 1/f, which may be equal to approximately $1.67 \times 10^{-10}$. The values of the filter coefficients may be selected such that the signal loss on the signal transmission channel is approximately equal to that of the preferred loss profile.

If, on the other hand, the system includes an analog filter, the method may proceed to step 545. At step 545, the value of pole frequencies $f_{p1}$ and $f_{p2}$ may be selected. As discussed above with respect to FIG. 4, the transfer function of an analog filter may be represented by the following equation:

$$H(f) = \frac{f_{p1}}{f + f_{p1}} * \frac{f_{p2}}{f + f_{p2}} * G,$$

where f is the frequency of interest, $f_{p1}$ and $f_{p2}$ are the frequencies at the poles of the analog filter, and G is a gain constant. In some embodiments, f may be equal to the Nyquist frequency (6 GHz). In some embodiments, the value of the gain constant, G, may be approximately equal to or less than one (1). The value of the pole frequencies may be selected such that the signal loss on the signal transmission channel is approximately equal to that of the preferred loss profile.

At step 550, the signal may be filtered and transmitted to the receiver. As discussed above with respect to FIG. 1, a digital or analog filter included in the transmitter may receive a data signal from a memory and/or logic core of the transmitter. The data signal may be filtered such that the signal loss of the filtered signal approximates a preferred loss profile. The filtered signal may then be transmitted to the receiver via the signal transmission channel.

At step 560, the signal received by the receiver may be compared to the preferred loss profile to determine whether the filter coefficients or pole frequencies should be refined. As discussed above with respect to FIGS. 2 and 4, in some embodiments, a system administrator and/or system designer may evaluate the waveform of a data signal received at the receiver and modify the value of the filter coefficients or pole frequencies such that the signal loss of the filtered signal more closely approximates a preferred loss profile. In other embodiments, the receiver may be configured to transmit the waveform of the received signal to the logic core of the transmitter. The logic core may be configured to evaluate the waveform and modify the value of the filter coefficients or pole frequencies such that the signal loss of the filtered signal more closely approximates a preferred loss profile.

If it is determined that the filter coefficients or pole frequencies do not warrant modification, the method may return to step 520 to be repeated for a different signal transmission channel of the information handling system. If, on the other hand, the filter coefficients or pole frequencies do warrant modification, the method may proceed to step 570. At step 570, the loss profile of the signal transmission channel with the existing signal coefficients or pole frequencies may be determined. As stated above with respect to step 520, a signal may be transmitted from a transmitter to a receiver via the particular signal transmission channel and a graph of the waveform of the received signal may be analyzed to determine the signal loss experienced at various frequencies. When the loss profile the signal transmission channel with the existing signal coefficients or pole frequencies has been determined, the method may return to step 530.

Although the present disclosure has been described in detail, it should be understood that various changes, substitutions, and alterations can be made hereto without departing from the spirit and the scope of the disclosure as defined by the appended claims.

What is claimed is:

1. A signal processing method, the method comprising:
identifying a preferred loss profile for a plurality of signal transmission channels;
generating a filter transfer function corresponding to each of the plurality of signal transmission channels, each filter transfer function configured to produce a filtered signal with a loss profile approximately equal to the preferred loss profile at a Nyquist frequency;
generating a plurality of filtered signals by filtering a plurality of signals using the filter transfer function corresponding to each of the plurality of signal transmission channels; and
transmitting the plurality of filtered signals to a plurality of receivers via the plurality of signal transmission channels.

2. The method of claim 1, the method further comprising:
receiving a waveform corresponding to a particular filtered signal of the plurality of filtered signals;
determining a loss profile of the particular filtered signal;
generating a modified filter transfer function based on the loss profile of the particular filtered signal.

3. The method of claim 1, wherein the filter transfer function corresponding to a particular signal transmission channel of the plurality of signal transmission channels is equal to $$\sum_{n=0}^{N} C_n \left( e^{\sqrt{-1} * 2\pi fT} \right)^{-n}$$

and a value of $C_n$ is a filter coefficient.

4. The method of claim 1, wherein the filter transfer function corresponding to a particular signal transmission channel of the plurality of signal transmission channels is equal to $$\frac{f_{p1}}{f + f_{p1}} * \frac{f_{p2}}{f + f_{p2}} * G,$$

and wherein f is a frequency of interest, $f_{p1}$ and $f_{p2}$ are frequencies at poles of the analog filter, and G is a gain constant.

5. An information handling system, the system comprising:
a plurality of receivers;
a plurality of signal transmission channels;
a plurality of transmitters, each transmitter communicatively coupled to one of the plurality of receivers via one of the plurality of signal transmission channels, each transmitter configured to:
generate a filter transfer function configured to produce a filtered signal with a loss profile approximately equal to a preferred loss profile of the plurality of signal transmission channels at a Nyquist frequency;
generate a filtered signal using the filter transfer function; and
transmit the filtered signal to one of the plurality of receivers via one of the plurality of signal transmission channels.

6. The system of claim 5, wherein the transmitter is further configured to:
receive a waveform of the filtered signal;
determine a loss profile of the filtered signal; and
generate a modified filter transfer function based on the loss profile of the filtered signal.

7. The system of claim 5, wherein the filter transfer function is equal to $$\sum_{n=0}^{N} C_n \left( e^{\sqrt{-1} * 2\pi fT} \right)^{-n}$$

and a value of $C_n$ is a filter coefficient.

8. They system of claim 5, wherein the filter transfer function corresponding to a particular signal transmission channel of the plurality of signal transmission channels is equal to $$\frac{f_{p1}}{f + f_{p1}} * \frac{f_{p2}}{f + f_{p2}} * G,$$

and wherein f is a frequency of interest, $f_{p1}$ and $f_{p2}$ are frequencies at poles of the analog filter, and G is a gain constant.

9. A non-transitory computer readable storage medium, comprising computer-executable instructions carried on the computer readable medium, the instructions readable by a processor and, when read and executed, configured to cause the processor to:
generate a filter transfer function configured to produce a filtered signal with a loss profile approximately equal to a preferred loss profile of a plurality of signal transmission channels at a Nyquist frequency;
generate a filtered signal using the filter transfer function; and
transmit the filtered signal to a receiver via one of the plurality of signal transmission channels.

10. The non-transitory computer readable medium of claim 9, the instructions, when read and executed, further configured to cause the processor to:
receive a waveform of the filtered signal;
determine a loss profile of the filtered signal; and
generate a modified filter transfer function based on the loss profile of the filtered signal.

11. The non-transitory computer readable medium of claim 9, wherein the filter transfer function is equal to $$\sum_{n=0}^{N} C_n \left( e^{\sqrt{-1} * 2\pi fT} \right)^{-n}$$

and a value of $C_n$ is a filter coefficient.

12. The non-transitory computer readable medium of claim 9, wherein the filter transfer function corresponding to a particular signal transmission channel of the plurality of signal transmission channels is equal to $$\frac{f_{p1}}{f + f_{p1}} * \frac{f_{p2}}{f + f_{p2}} * G,$$

and wherein f is a frequency of interest, $f_{p1}$ and $f_{p2}$ are frequencies at poles of the analog filter, and G is a gain constant.

13. The method of claim 1, wherein the Nyquist frequency is approximately 6 GHz.

14. The system of claim 5, wherein the Nyquist frequency is approximately 6 GHz.

15. The non-transitory computer readable storage medium of claim 9, wherein the Nyquist frequency is approximately 6 GHz.

\* \* \* \* \*